US005974789A

United States Patent [19]

Mathes et al.

[11] Patent Number: 5,974,789

[45] Date of Patent: Nov. 2, 1999

[54] METHOD AND DEVICE FOR DECOMPOSING NITROGEN OXIDES IN THE EXHAUST GAS OF AN INTERNAL COMBUSTION ENGINE

[75] Inventors: Wieland Mathes, Michelau; Lothar Hofmann, Altenkunstadt; Detlev Schöppe, Wenzenbach; Erwin Achleitner, Obertraubling; Rainer Tost, Nürnberg, all of Germany

[73] Assignee: Siemens Aktiengesellschaft, Munich, Germany

[21] Appl. No.: 09/028,235

[22] Filed: Feb. 23, 1998

Related U.S. Application Data

[63] Continuation of application No. PCT/DE96/01558, Aug. 22, 1996.

[30] Foreign Application Priority Data

Aug. 23, 1995 [DE] Germany ........................... 195 31 028

[51] Int. Cl.[6] ........................................................ F01N 3/00

[52] U.S. Cl. ................................ 60/274; 60/280; 60/286; 60/289; 60/307

[58] Field of Search ............................. 60/280, 286, 301, 60/303, 307, 289, 274

[56] References Cited

U.S. PATENT DOCUMENTS

| | | | |
|---|---|---|---|
| 4,010,607 | 3/1977 | Hopping | 60/280 |
| 5,116,579 | 5/1992 | Kobayashi et al. | 422/111 |
| 5,205,120 | 4/1993 | Oblander et al. | 60/284 |
| 5,460,784 | 10/1995 | Gillbrand et al. | 60/289 |
| 5,653,101 | 8/1997 | Lane et al. | 60/280 |
| 5,813,224 | 9/1998 | Rao et al. | 60/274 |

FOREIGN PATENT DOCUMENTS

| | | |
|---|---|---|
| 0381236A1 | 8/1990 | European Pat. Off. . |
| 0555746A1 | 8/1993 | European Pat. Off. . |
| 0586913A2 | 3/1994 | European Pat. Off. . |
| 0617199B1 | 9/1994 | European Pat. Off. . |
| 3821832c1 | 11/1989 | Germany . |
| 4417238A1 | 9/1994 | Germany . |
| 4310926A1 | 10/1994 | Germany . |
| 4315278A1 | 11/1994 | Germany . |

OTHER PUBLICATIONS

Japanese Patent Abstract No. 2207119 (Hiroshi et al.), dated Aug. 16, 1990.

Japanese Patent Abstract No. 59049824 (Toshio), dated Mar. 22, 1984.

*Primary Examiner*—Thomas E. Denion

*Attorney, Agent, or Firm*—Herbert L. Lerner; Laurence A. Greenberg

[57] ABSTRACT

A method and a device for decomposing nitrogen oxides in an exhaust gas of an internal combustion engine, include feeding the exhaust gas and a reactant which is sprayed into the exhaust gas through the use of compressed air, to a catalytic converter. A compressor for supplying compressed air is associated with the internal combustion engine, and part of the compressed air is diverted and used as the compressed air for injecting the reactant. The sprayed reactant is fed to the catalytic converter, together with the exhaust gas to be purified, which ensures the decomposition of the nitrogen oxides, in particular according to the method of selective catalytic reaction.

12 Claims, 2 Drawing Sheets

METHOD AND DEVICE FOR DECOMPOSING NITROGEN OXIDES IN THE EXHAUST GAS OF AN INTERNAL COMBUSTION ENGINE

CROSS-REFERENCE TO RELATED APPLICATION

This application is a continuation of International Application Ser. No. PCT/DE96/01558, filed Aug. 22, 1996, which designated the United States.

BACKGROUND OF THE INVENTION

Field of the Invention

The invention relates to a method for decomposing nitrogen oxides in an exhaust gas of an internal combustion engine, in which the exhaust gas and a reactant that is sprayed into the exhaust gas through the use of compressed air are fed to a catalytic converter. Moreover, the invention relates to a device for decomposing nitrogen oxides in the exhaust gas of an internal combustion engine, having a catalytic converter for receiving the exhaust gas and a reducing agent which is to be sprayed into the exhaust gas through the use of compressed air, and a spraying device for spraying the reducing agent.

The principle of a regulated or controlled diesel catalytic converter (CDC) has proved to be expedient for reducing pollutants, especially nitrogen oxides, contained in the exhaust gas of an internal combustion engine. That principle is applied primarily in internal combustion engines which are operated with excess air, such as, for example, in diesel and lean-burn engines. The principle, which is based essentially on the method of selective catalytic reduction (SCR), has in the meantime been disclosed in numerous publications, e.g. in German Published, Non-Prosecuted Patent Application DE 43 10 926 A1, German Published, Non-Prosecuted Patent Application DE 43 15 278 A1 corresponding to U.S. Pat. No. 5,628,186, and European Patent 0 617 199 B1 corresponding to co-pending U.S. application Ser. No. 08/490,115, filed Jun. 12, 1995. In the SCR method, the nitrogen oxides are contacted, together with ammonia, on a selective catalyst and are converted there into nitrogen and water.

Due to the problems associated with the use of ammonia, namely the toxicity and the potential noxious odor, ammonia as such should not be carried in the vehicle if the internal combustion engine is fitted with a CDC system. The reactant which is necessary for the catalytic conversion of the nitrogen oxides is therefore transported in the vehicle in the form of an aqueous solution of urea or the like. The ammonia is produced from the aqueous solution by hydrolysis, in each case in the quantity required to convert the nitrogen oxides which have been generated. Pure ammonia or ammonia solution can be used in a stationary flue gas purification system, e.g. in the exhaust gas line of a power plant.

In accordance with German Published, Non-Prosecuted Patent Application DE 44 17 238 A1, provision is made for the exhaust-gas line of a diesel engine of a truck to be fed directly up to the side of a cylindrical inlet chamber in which a perforated plate shaped to form a funnel is disposed. An aqueous urea solution is injected into the inner space of the funnel through the use of an injection valve provided at the narrowest point of the funnel. In that way, a homogeneous distribution of the urea solution in the exhaust gas is achieved over the entire cross section of the inlet chamber.

Adjoining the inlet chamber are a hydrolysis catalyst, a $DeNO_x$ catalyst and, if appropriate, an oxidation catalyst.

A solution which is described in European Patent Application 0 586 913 A2 differs from the above. In order to obtain sufficient nebulization of the medium to be nebulized, i.e. an aqueous solution of urea, a mixing device or premixing chamber is provided upstream of where it is introduced into the flow of exhaust gas containing pollutants. The medium and a compressed gas, such as air, are introduced into the premixing chamber for intimate mixing with one another, i.e. to form a dispersion. The premixing chamber is connected through the use of a mixing line or pipe to a nebulizing nozzle which, in turn, is disposed in the flow of exhaust gas. It is possible to achieve quite a good distribution of the aqueous solution in the flow of exhaust gas with the premixing and the spraying-in. In that case, the use of the compressed air also brings about cooling of the nebulizing nozzle located in the hot flow of exhaust gas.

The compressed air which is required for the injection and spraying-in is usually produced in a special compressor that has to be provided specially, which incurs costs.

SUMMARY OF THE INVENTION

It is accordingly an object of the invention to provide a method and an exhaust-gas purification device for decomposing nitrogen oxides in the exhaust gas of an internal combustion engine, which overcome the hereinafore-mentioned disadvantages of the heretofore-known methods and devices of this general type and which operate without a special compressor for injection of compressed air.

With the foregoing and other objects in view there is provided, in accordance with the invention, a method for decomposing nitrogen oxides in an exhaust gas of an internal combustion engine, which comprises charging an internal combustion engine with air compressed by a compressor; injecting or spraying a reactant into an exhaust gas from the internal combustion engine with a diverted part of the compressed air from the compressor; and feeding the exhaust gas and the reactant to a catalytic converter.

This can also be expressed as follows: the method is distinguished by the fact that, in a supercharged internal combustion engine, the compressed air required to inject the reducing agent is diverted from the compressed air which is fed to the internal combustion engine. In this case, the supercharging may be carried out through the use of a mechanically driven charger, e.g. through the use of a transmission, V-belt or other type of charger of any construction.

In accordance with another mode of the invention, the compressor is driven by a turbine which is charged with the exhaust gas. The compressor and the turbine may form an exhaust-gas turbocharger.

In accordance with a further mode of the invention, as an alternative, the compressor is driven directly by the internal combustion engine, that is to say the compressor is a "compressor" in the sense of conventional usage in automotive engineering.

In accordance with an added mode of the invention, the reactant is distributed homogeneously in the exhaust gas before the exhaust gas reaches the catalytic converter. In this way, complete conversion of the reactant with the nitrogen oxides contained in the exhaust gas can be achieved, while preventing the reactant or decomposition products produced therefrom from being given off into the atmosphere.

In accordance with an additional mode of the invention, the reactant contains a substance which, after having been mixed into the exhaust gas, is decomposed with the formation of ammonia, with the ammonia being made to react with the nitrogen oxides on the catalyst. An example of such a substance is urea. In contrast to ammonia, urea is neither toxic nor unpleasant in any other way, and it can be readily carried in a motor vehicle in the form of an aqueous solution, in particular without taking any special safety precautions.

With the objects of the invention in view, there is also provided a device for decomposing nitrogen oxides in an exhaust gas of an internal combustion engine, comprising a compressor for producing and conducting compressed air, the compressor associated with an internal combustion engine; a bifurcation for diverting part of the compressed air at a location between the compressor and the internal combustion engine; a spraying device connected to the bifurcation for spraying a reactant into an exhaust gas from the internal combustion engine with the diverted part of the compressed air; and a catalytic converter for receiving the exhaust gas and the reactant.

Major advantages of this device emerge from the descriptions of the method according to the invention and the following description of preferred exemplary embodiments to which reference is made herein.

In accordance with another feature of the invention, the bifurcation is positioned directly at the internal combustion engine in a compressor line leading from the compressor to the internal combustion engine.

In accordance with a further feature of the invention, the compressor belongs to an exhaust-gas turbocharger which, in addition to the compressor, contains a turbine that is charged with the exhaust gas from the internal combustion engine, or the compressor is connected to the internal combustion engine through the use of a mechanical drive.

In accordance with an added feature of the invention, a charge-air cooler for cooling the compressed air is provided between the compressor and the internal combustion engine, and the bifurcation is disposed between the charge-air cooler and the internal combustion engine. Air which has undergone cooling in the charge-air cooler is thus provided for spraying the reactant. In particular, this can avoid any undesirable decomposition of the reactant taking place in the spraying device or even ahead of the spraying device. This is particularly important when urea is used as the reactant.

In accordance with a concomitant feature of the invention, the catalytic converter is constructed for the selective catalysis of a reaction between nitrogen oxides and a reducing agent, in particular ammonia, with the reducing agent either being the reactant itself, as was mentioned several times above, or a decomposition product of the reactant.

Other features which are considered as characteristic for the invention are set forth in the appended claims.

Although the invention is illustrated and described herein as embodied in a method and a device for decomposing nitrogen oxides in the exhaust gas of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
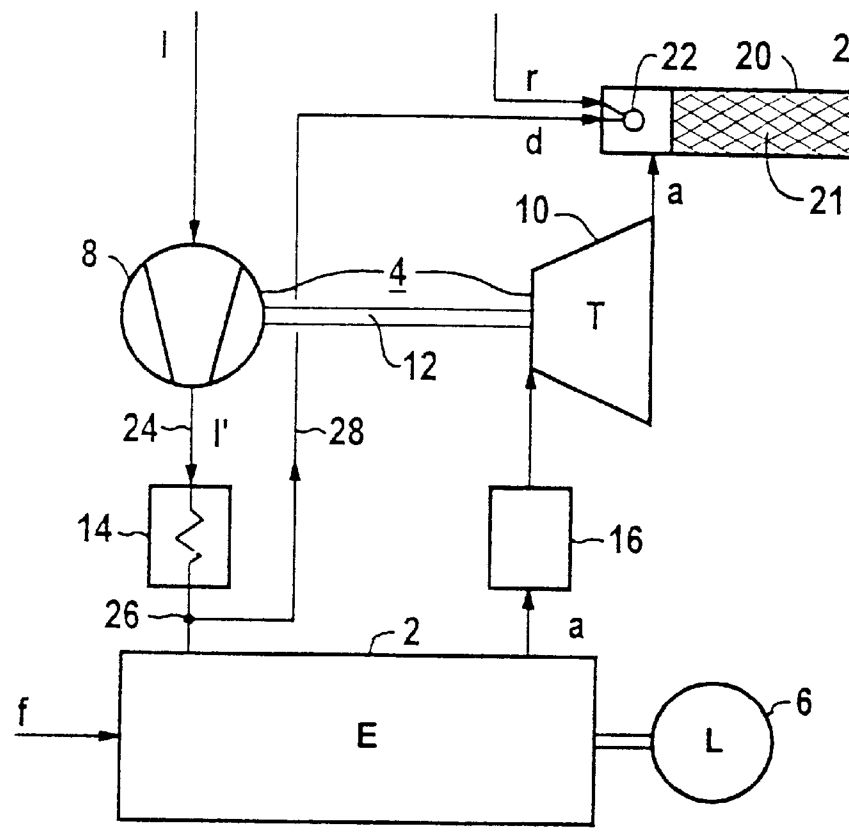
FIG. 1 is a diagrammatic and schematic illustration of an exhaust-gas purification device in conjunction with an internal combustion engine having an exhaust-gas turbocharger.
Figure 3:
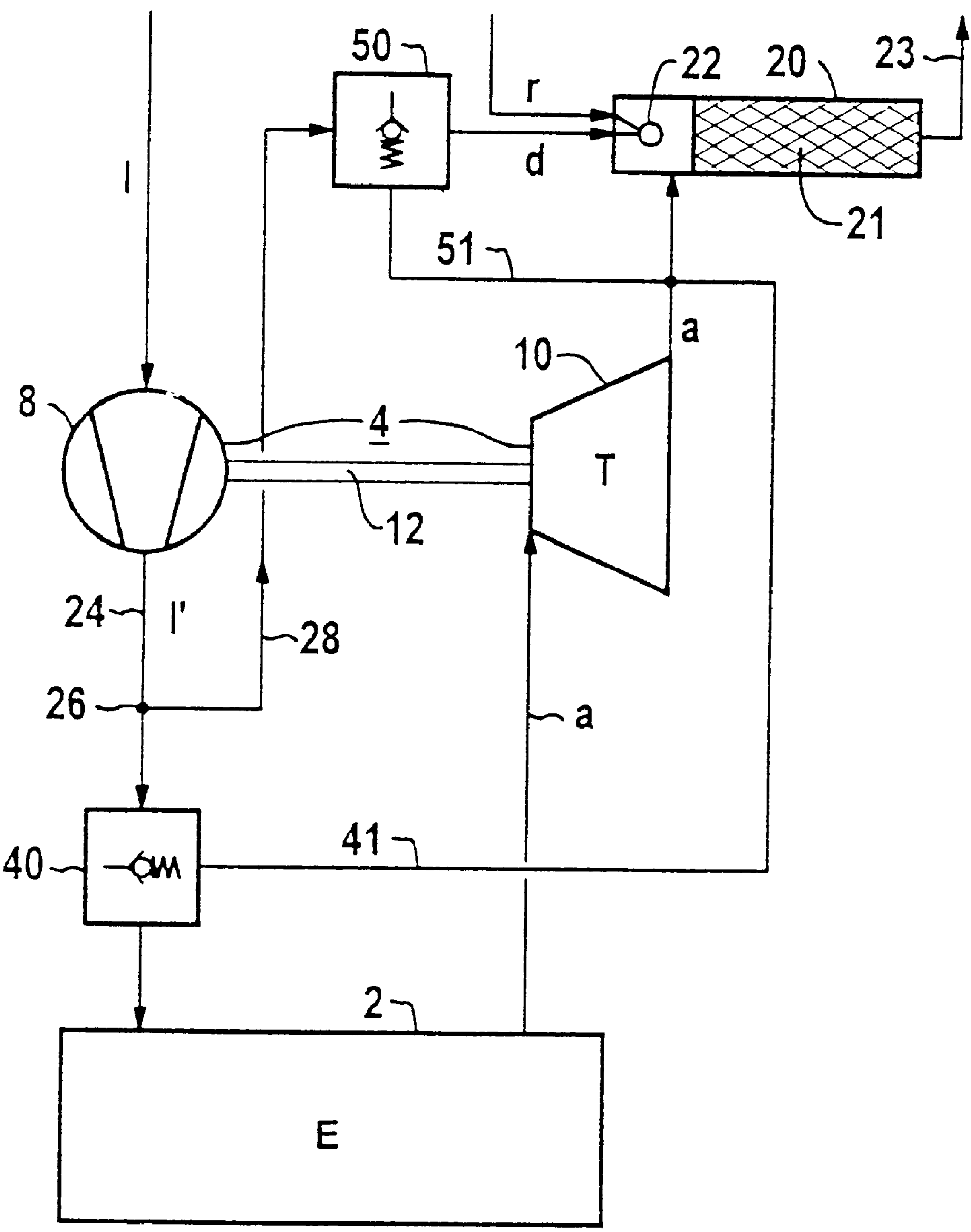
FIG. 3 is a diagrammatic and schematic illustration of an exhaust-gas purification device in conjunction with an internal combustion engine having an exhaust-gas turbocharger and a charging-pressure controller.

Referring now to the figures of the drawings in detail and first, particularly, to FIG. 1 thereof, as well as to FIG. 3 which corresponds to FIG. 1 in many features, there is seen an internal combustion engine 2, e.g. a diesel engine, which is provided with an exhaust-gas turbocharger 4. The internal combustion engine 2, which is supplied with a fuel f, drives a load 6, for example a motor vehicle or a stationary machine. The exhaust-gas turbocharger 4 includes a compressor 8 and a turbine 10, which are connected to one another through the use of a shaft 12. The internal combustion engine 2 has an entry container 14, which may be constructed, in particular, as a charge-air cooler. The internal combustion engine 2 also has an exit container 16. An exhaust-gas purification device 20, which contains a diagrammatically illustrated SCR catalytic converter 21 and a spraying device 22, serves to purify exhaust gas a which is given off during operation of the internal combustion engine 2 ($DeNO_x$ purification).

Air 1 sucked in by the compressor 8 during operation is given off as compressed air 1' and is fed through the entry container 14 to the internal combustion engine 2. The exhaust gas a which is generated there passes through the exit container 16 into the turbine 10 which serves to drive the compressor 8. The exhaust gas a given off by the turbine 10 is conducted to the exhaust-gas purification device 20 for the purpose of $DeNO_x$ purification according to the SCR method. In addition to the exhaust gas a to be purified, a reactant r, in particular present aqueous urea, which is sprayed or injected through the use of compressed air d in the spraying device 22, is fed to the exhaust-gas purification device 20. The purified exhaust gas a is discharged through an outlet 23, e.g. a tail pipe.

In this case it is important that part of the air 1' which is compressed in the compressor 8 and is present any way in a compressor line 24 be diverted through the use of a bifurcation 26, specifically at an outlet of the entry container 14, be conducted through a line 28 as the compressed air d to the spraying device 22 and thus be used to inject the reactant r. A special compressor for injecting the reactant r is therefore not required. In this case the bifurcation 26 is positioned directly at the entry of the compressor line 24 to the internal combustion engine 2.

Figure 2:
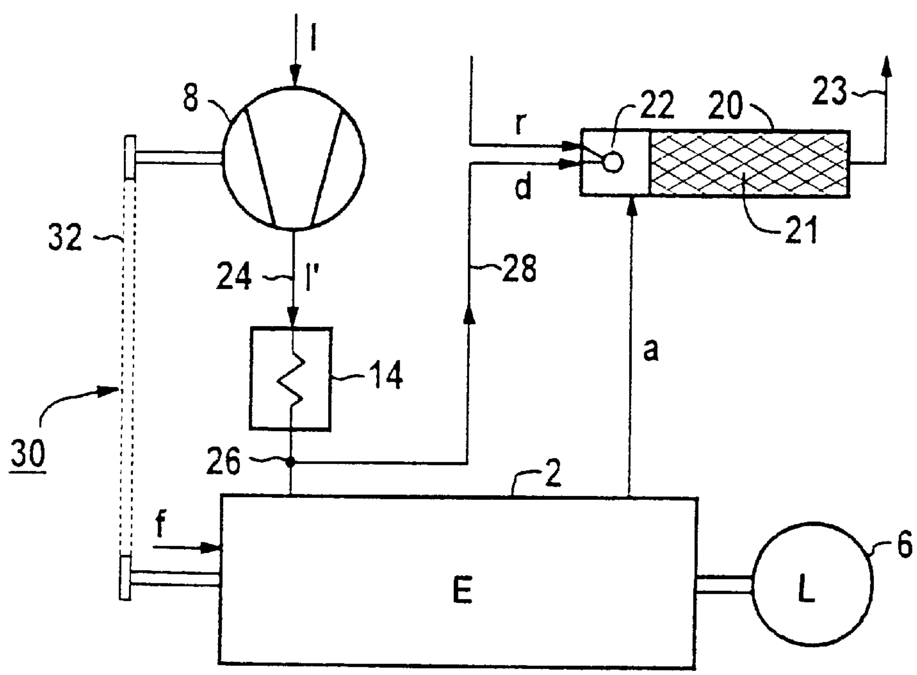
FIG. 2 is a diagrammatic and schematic illustration of an exhaust-gas purification device in conjunction with an internal combustion engine having a mechanical charger.

In the exemplary embodiment according to FIG. 2, a mechanical charger 30 is provided instead of the exhaust-gas turbocharger 4. In addition to the compressor 8, the mechanical charger 30 includes a transmission or gear mechanism 32 through the use of which energy given off by the engine 2 is used to drive the compressor 8. The additional drive is largely identical to that of FIG. 1, and a repeated description can therefore be dispensed with. In this case too, a bifurcation 26 is provided between the compressor 8, specifically downstream of the charge-air cooler 14, and the supercharged internal combustion engine 2. Part of the air 1' compressed by the compressor 8 is again diverted through the bifurcation 26. In this case as well, the bifurcation 26 is connected to the spraying device 22 through the use of the line 28, in such a way that the diverted part of the compressed air 1' serves as compressed air d for injecting the reactant r. In this case too, a special compressor is not required. In contrast, the compressor 8 which is required for supercharging and is present in any case is used.

The exemplary embodiment according to FIG. 3 likewise includes an internal combustion engine 2 which is supercharged with compressed air 1' through the use of an exhaust-gas turbocharger 4 having a compressor 8 and a turbine 10. The exhaust gas a of the engine 2 likewise passes downstream of the turbine 10 into an exhaust-gas purification device 20. In this case, the construction and mode of functioning correspond largely to the exemplary embodiment according to FIG. 1 and the descriptions concerning FIG. 1 can thus be applied analogously to FIG. 3. As a particular feature, FIG. 3 shows a charging-pressure controller 40 which is inserted into the compressor line 24 and is used to limit the pressure at which the compressed air 1' charges the internal combustion engine 2. The use of such a charging-pressure controller 40 is widespread for internal combustion engines 2 in motor vehicles, in particular those internal combustion engines 2 which have to be driven under frequently changing loads. In the simplest case, the charging-pressure controller 40 is formed of a spring-loaded valve, as is also indicated in FIG. 3, and is provided with a blow-off line 41 through which excess air is fed to the exhaust gas a downstream of the turbine 10. In order to have compressed air at as high a pressure as possible available for the spraying device 22 in the exhaust-gas purification device 20, the bifurcation 26 is provided between the compressor 8 and the charging-pressure controller 40. The charging-pressure controller 40 thus remains ineffective for the part of the compressed air to be fed to the spraying device 22, and the diverted part of the compressed air is thus at essentially that pressure at which it is supplied by the compressor 8. The use of a charging-pressure controller 40 is otherwise not limited to use in conjunction with an exhaust-gas turbocharger 4. Naturally, a charging-pressure controller 40 is also possible in conjunction with a compressor 8 which is driven directly by the internal combustion engine 2, as can be seen in FIG. 2.

FIG. 3 also shows an additional special feature, which is a pressure controller 50 in the line 28 that leads from the bifurcation 26 to the exhaust-gas purification device 20. This pressure controller also has a blow-off line 51 which feeds blown-off air to the exhaust gas a downstream of the turbine 10. The pressure controller 50 permits autonomous control of the pressure at which the diverted part of the compressed air 1' passes to the spraying device 22, and can thus contribute to stable operation of the spraying device 22. It should be noted that the use of blow-off lines 41 and 51, as illustrated in FIG. 3, is not at all essential, but rather the mode of operation of the pressure controllers 40 and 50 can be provided in any way possible. According to a further refinement of the exemplary embodiment according to FIG. 3, a charge-air cooler 14 may be provided, for example, as in the exemplary embodiments of FIGS. 1 and 2. The charge-air cooler 14 would then be disposed, for example, between the compressor 8 and the bifurcation 26, although a different configuration is, of course, not excluded.

The invention acts in a particularly advantageous manner to combine an exhaust-gas purification device with a compressor for compressing air to be supplied on an internal combustion engine. It only requires little outlay and ensures effective removal of nitrogen oxides from the exhaust gas of the internal combustion engine.

We claim:

1. A method for decomposing nitrogen oxides in an exhaust gas of an internal combustion engine, which comprises:

charging an internal combustion engine with air compressed by a compressor;

feeding a diverted part of the compressed air from the compressor to a spraying device;

spraying a reactant directly into an exhaust gas from the internal combustion engine with the diverted part of the compressed air from the compressor, the reactant containing a substance decomposing with the formation of ammonia after the reactant has been mixed into the exhaust gas; and feeding the exhaust gas and the reactant to a catalytic converter.

2. The method according to claim 1, which comprises driving the compressor with a turbine charged with the exhaust gas.

3. The method according to claim 1, which comprises driving the compressor directly with the internal combustion engine.

4. The method according to claim 1, which comprises homogeneously distributing the reactant in the exhaust gas before the exhaust gas reaches the catalytic converter.

5. The method according to claim 4, which comprises reacting the ammonia with nitrogen oxides in the catalyst converter.

6. A device for decomposing nitrogen oxides in an exhaust gas of an internal combustion engine, comprising:

a compressor for producing and conducting compressed air, said compressor associated with an internal combustion engine;

a bifurcation for diverting part of the compressed air at a location between said compressor and the internal combustion engine;

a spraying device connected to said bifurcation for spraying a reactant directly into an exhaust gas from the internal combustion engine with the diverted part of the compressed air, the reactant containing a substance decomposing with the formation of ammonia after the reactant has been mixed into the exhaust gas; and a catalytic converter for receiving the exhaust gas and the reactant.

7. The device according to claim 6, including a compressor line leading from said compressor to the internal combustion engine, said bifurcation positioned directly at the internal combustion engine in said compressor line.

8. The device according to claim 6, wherein said compressor is part of an exhaust-gas turbocharger.

9. The device according to claim 6, including a mechanical drive connecting said compressor to the internal combustion engine.

10. The device according to claim 6, including a charge-air cooler disposed between said compressor and the internal combustion engine for cooling the compressed air, said bifurcation disposed between said charge-air cooler and the internal combustion engine.

11. The device according to claim 6, wherein said catalytic converter is constructed for the selective catalysis of a reaction between nitrogen oxides and a reducing agent.

12. The device according to claim 11, wherein the reducing agent is ammonia.

* * * * *